(12) United States Patent
Böer et al.

(10) Patent No.: US 8,622,025 B2
(45) Date of Patent: Jan. 7, 2014

(54) INDOOR FISHFARM WITH RAISED TANK

(75) Inventors: Marco Böer, Visbek-Varnhorn (DE); Torsten Gritzka, Vechta (DE)

(73) Assignee: Big Dutchman International GmbH, Vechta (DE)

( * ) Notice: Subject to any disclaimer, the term of this patent is extended or adjusted under 35 U.S.C. 154(b) by 359 days.

(21) Appl. No.: 13/123,038

(22) PCT Filed: Dec. 8, 2009

(86) PCT No.: PCT/IB2009/007694
§ 371 (c)(1),
(2), (4) Date: Jul. 26, 2011

(87) PCT Pub. No.: WO2010/041153
PCT Pub. Date: Apr. 15, 2010

(65) Prior Publication Data
US 2011/0290191 A1    Dec. 1, 2011

(30) Foreign Application Priority Data
Oct. 8, 2008   (DE) ..................... 20 2008 013 223 U

(51) Int. Cl.
*A01K 63/00* (2006.01)

(52) U.S. Cl.
USPC ............................ 119/224; 119/245; 119/248

(58) Field of Classification Search
USPC ......... 119/224, 225, 226, 245, 248, 251, 252, 119/249
See application file for complete search history.

(56) References Cited

U.S. PATENT DOCUMENTS

| | | | |
|---|---|---|---|
| 3,464,387 A * | 9/1969 | Martinez | 119/252 |
| 5,450,818 A * | 9/1995 | Caillouet | 119/223 |
| 5,469,810 A | 11/1995 | Chiang | |
| 6,257,170 B1 | 7/2001 | Gundersen | |
| 6,499,431 B1 | 12/2002 | Lin et al. | |
| 6,543,386 B1 * | 4/2003 | Boggs | 119/248 |
| 7,311,822 B2 * | 12/2007 | Hochgesang et al. | 210/167.21 |
| 2005/0166858 A1 | 8/2005 | Lari | |
| 2006/0225661 A1 * | 10/2006 | Riemma | 119/245 |
| 2011/0107977 A1 * | 5/2011 | Smalls | 119/216 |
| 2012/0042832 A1 * | 2/2012 | Trisel | 119/248 |

FOREIGN PATENT DOCUMENTS

| | | |
|---|---|---|
| DE | 3741998 | 6/1989 |
| DE | 3827713 | 2/1990 |
| DE | 19521037 | 12/1996 |
| DE | 19847027 | 4/2000 |
| DE | 60027305 | 1/2007 |
| DE | 102006019741 | 2/2007 |
| DE | 102007002584 | 10/2007 |
| RU | 28886 | 4/2003 |
| WO | 9214356 | 9/1992 |
| WO | 9321760 | 11/1993 |
| WO | 0101765 | 1/2001 |
| WO | 2005011369 | 2/2005 |
| WO | 2006096910 | 9/2006 |

* cited by examiner

*Primary Examiner* — Monica Williams
(74) *Attorney, Agent, or Firm* — Price Heneveld LLP

(57) ABSTRACT

An indoor fish tank has a of walls and bottoms interconnected to define distinct fish holding, sedimentation and bioreactor sections. Water flows out of the bioreactor section into the top of the fish holding section, and then from the bottom of the fish holding section into the sedimentation section. A frame structure with braces connected with the tank walls and bottoms supports the tank on a ground support, with at least the bottom of the fish holding section raised above the ground surface.

17 Claims, 7 Drawing Sheets

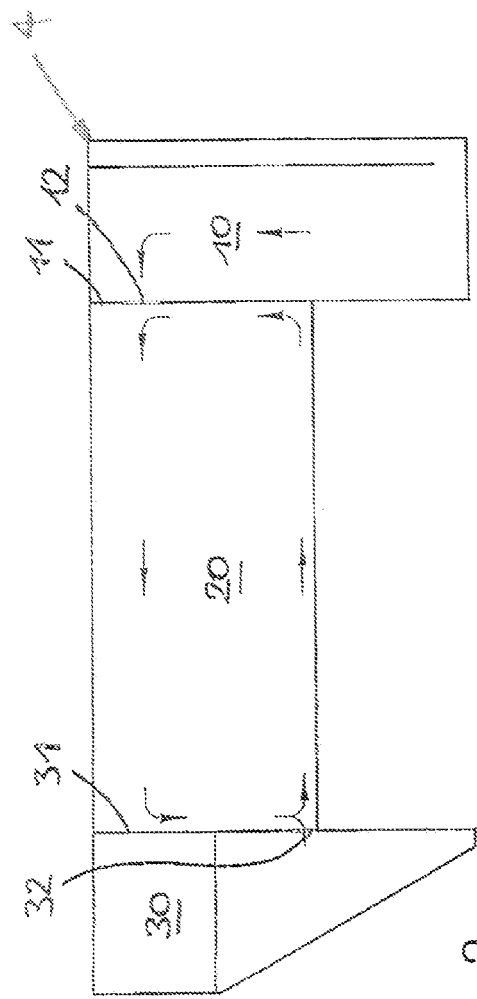
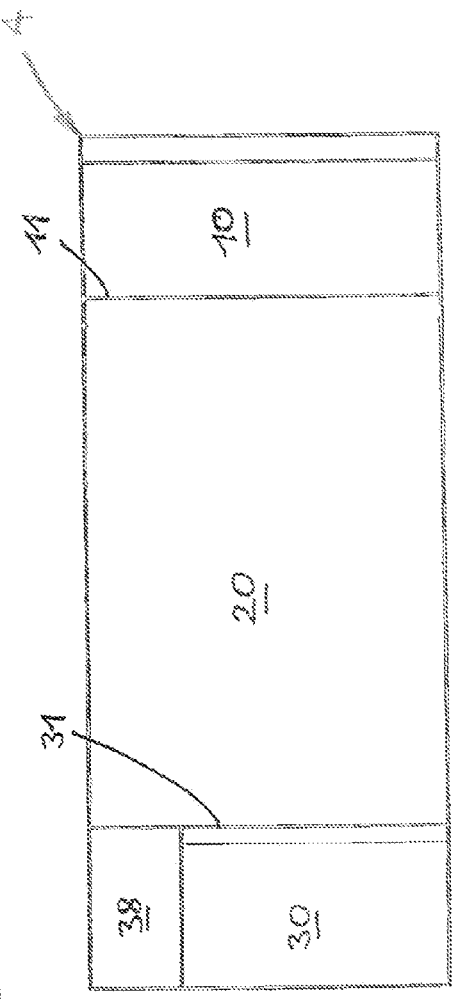

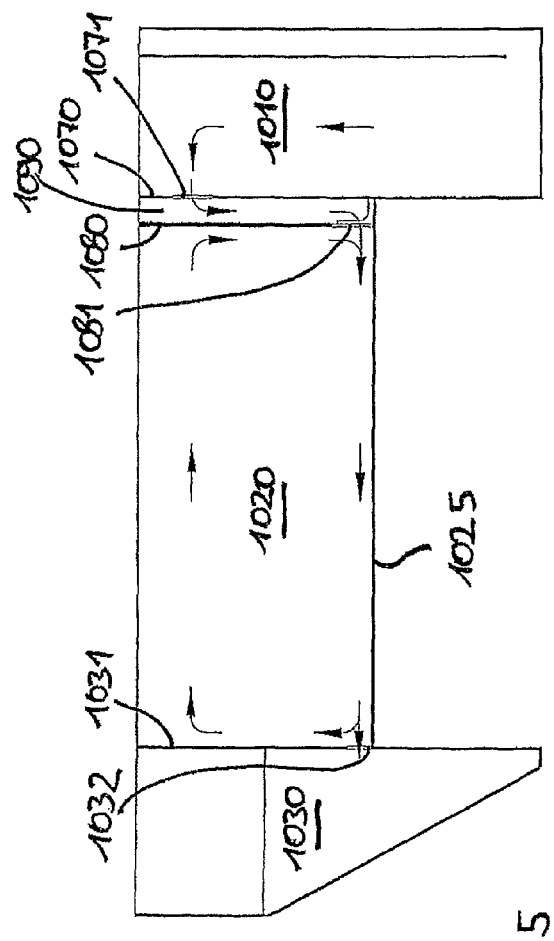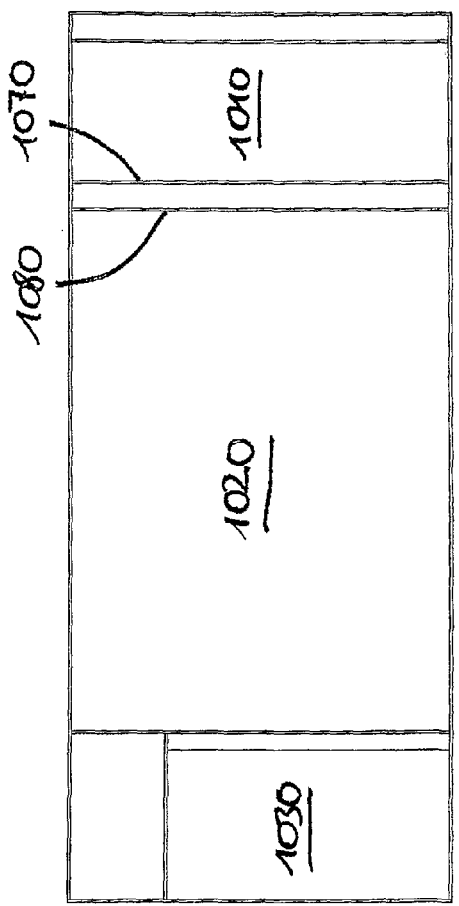
Fig. 5
Fig. 6

INDOOR FISHFARM WITH RAISED TANK

BACKGROUND OF THE INVENTION

The present invention relates to an indoor fish tank, comprising walls and floors which define a tank container having a fish holding section, a sedimentation section connected via at least one opening to the fish holding section in such a way that water from a region close to the ground flows from the fish holding section into the sedimentation section, and a bioreactor section which is connected via at least one opening to the fish holding section in such a way that water from a region close to the upper surface flows out of the bioreactor section into the fish holding section.

Overfishing and environmental influences have led to a stagnation of fishery yields worldwide, and to a decline in yields for some species of fish. One promising approach for preserving natural fish stocks is to breed fish in aquacultures. A distinction is made here inbetween extensive and intensive aquacultures, wherein intensive aquacultures are able to produce higher yields than extensive aquacultures due to artificial feeding.

Fish ponds, launder systems and net pen aquacultures are aquaculture methods that are currently used to significant commercial extent. However, each of these forms of aquaculture exhibit specific problems caused by factors relating to approval regulations, on the one hand, and relating, on the other hand, to the need for a continuous supply of fresh water (in the case of launder systems), and to the continuous removal of fish feces and food remnants into the natural surroundings (in the case of net pen aquaculture).

For many years, work has therefore been carried out to develop aquacultures that are designed as recirculation systems. These recirculation systems are also referred to as indoor fish farms, and are distinguished by fish being bred within a closed water circulation system. It should be understood in this regard that fish tanks of such recirculation systems are preferably erected inside buildings, although this indoor fish breeding technique in such recirculation systems could also be used outdoors.

A fish tank for fish breeding, suitable for intensive fish aquaculture in the form of a recirculation system, is known from German patent DE 195 21 037, the entire disclosure of which is incorporated herein by reference. From a technical perspective, the bioreactor section and the sedimentation section are considered important elements of such a fish tank. In the sedimentation section, solids are sedimented and removed from circulation, which necessitates feeding a small amount of fresh water as compensation into the (semi-)closed circuit. In the reactor section, oxygen is supplied by means of a finely distributed aeration system to the breeding water, and the organic substances are decomposed intensively by microorganisms therein.

Fish tanks of this kind are basically well-suited for a recirculation aquaculture. However, there is a need for improvements to be made to enable more efficient management of these fish tanks in larger fish farms, and in particular to enable maintenance work to be carried out more easily on the fish tank.

There is also a need for fish tanks that can be installed in a more cost-efficient manner than prior art fish tanks.

Finally, there is a need for indoor fish tanks which make it easier to harvest the fish.

SUMMARY OF THE INVENTION

These and other problems in the prior art are solved, according to a first aspect of the present invention, wherein an indoor fish tank of the kind initially specified is provided with a frame structure which defines a ground contact area on which the frame structure rests, and which is connected to the walls and/or floor of the fish tank in such a way that at least the bottom of the fish holding section, and preferably the bottoms of the sedimentation section and the reactor section, are disposed above the ground contact area.

With the aid of the frame structure, the indoor fish tank according to the invention is raised in its entirety onto stands that permit essential regions, or all regions filled with water to be above the floor of the building on which the frame structure is erected. As a consequence, the need for costly excavation work and foundation work when installing the fish tank is obviated. The external accessibility of the fish tank is also improved to the extent that all essential outer wall regions of the fish tank are accessible for maintenance and service work, due to its being disposed in a raised position, which substantially improves operations and the repairing of any damage. More particularly, raising the fish tank on stands allows an indoor fish farm to be disposed in an existing building, without the ground inside having to be modified, excavated or adapted in any such way. Instead, the inventive fish tank, including the frame structure accommodating it, can be erected on the floor of an existing building, thus substantially reducing the installation costs.

It should be understood in this regard that the fish tanks according to the present invention are breeding tanks. These typically and preferably have a total volume of 15-23 m3, preferably 20 m3. Of that total, 4-6 m3 is typically for the bioreactor section, in particular 5 m3, 8-12 m3 for the fish holding section, in particular 10 m3, and 3-5 m3 for the sedimentation section, in particular 4 m3.

It should be understood in this regard that not all bottom regions of the fish tank according to the present invention need necessarily be above the ground contact area of the frame structure. As can be seen from DE 195 21 037 A1, one advantageous structure for a fish tank can specifically be one in which both the sedimentation section and the reactor section of the fish tank have bottom regions which are lower than the fish holding section. In certain applications, it may therefore be advantageous to sink at least one lower segment of the sedimentation section and/or of the reactor section into a depression or hollow, and to dispose only the bottom of the fish holding section above the ground contact area or congruent therewith. What is preferred, however, is that the entire tank be disposed above the ground contact area, so that no regions of the tank extend into the ground on which the frame structure is standing.

According to a first preferred embodiment of the present invention, the frame structure consists of a plurality of braces or struts which rest against the outer surfaces of the walls and bottoms of the tank container and support the same against the static pressure of the volume of water held in the tank container. This embodiment gives the frame structure a twin functional benefit, firstly in that the frame structure absorbs the static pressure produced inside the tank by the pressure of the water, thus allows the tank to have a thinner walls and a material-saving design, which for its part does not have to be dimensioned to withstand the static pressure on its own. Secondly, the frame structure is used to bear the weight force of the fish tank at least partially, and preferably entirely, and to support it on the ground. To this end, a particularly preferred embodiment is one in which the frame structure has at least horizontal and vertical braces, and preferably diagonal bracing as well.

According to another preferred embodiment of the present invention, a closable opening is provided in a wall bounding the fish holding section, which preferably has a connector for attaching one end of a harvesting line located outside the tank container. Such an opening allows the water inside the fish tank, or at least inside the fish holding section of the fish tank, to be drained under the influence of gravity, and hence without the aid of pumps or the like. More particularly, however, such an opening can be used to simplify harvesting of the fish tank, in that the fish are removed along with the water through the opening, and if necessary, through the harvesting line into a separate container by the force of gravity, and in this way concentrate in a separate harvesting container. The water flowing into the harvesting container can be recycled to the fish tank, leaving the fish behind.

It is also preferred that the bioreactor section, the fish holding section and the sedimentation section are arranged fluidically in series in that order, and that the fish holding section is preferably disposed geometrically between the bioreactor section and the sedimentation section. In this way, a flow of water through the fish tank is achieved in a technically and geometrically advantageous manner, which permits direct delivery of fresh water into the fish holding section from the reactor section, and indirect removal of solids from the holding section into the sedimentation section, as a result of which the water quality in the aquaculture is optimized. The structure of a fish tank of such construction is particularly suitable for an arrangement having a plurality of fish tanks arranged in a water circuit.

The present invention can be developed or, according to a further aspect, embodied in a fish tank of the kind initially specified, wherein a flow shaft is disposed between the bioreactor section and the fish holding section, with the flow shaft being separated from the bioreactor section by a first bulkhead partition which has an opening in its top portion, and which is separated from the fish holding section by a second bulkhead partition which has an opening below the upper portion, preferably in the lower portion, the lower boundary edge of said opening preferably being level with the bottom of the fish holding section. According to this aspect of the present invention, a particularly beneficial flow of water through the fish tank, in particular through the fish holding section, is achieved. It is generally advantageous, on the one hand, when the bioreactor section has an outlet opening located near the surface of the water in the fish tank for the water which flows through the bioreactor section, in order that a flow of water through the entire bioreactor section is achieved by means of the air which is injected into its bottom region. On the other hand, it has been shown that it is desirable to improve the removal of sediment from the fish holding section through an opening in the bottom region of the fish holding section, between the fish holding section and the sedimentation section. This is achieved by means of the second bulkhead partition, in that the water discharged from the bioreactor section into the fish holding section is not discharged in the upper region, but rather into a lower region of the fish holding section. This causes a flow of water near the bottom in the fish holding section in the direction of the sedimentation section. This flow of water near the bottom of the fish holding section is beneficial and carries sediment efficiently into the sedimentation section, especially when the lower limit of both the opening in the second bulkhead partition and the opening between the fish holding section and the sedimentation section are level with the bottom surface of the fish holding section.

According to another aspect of the present invention, an indoor fish tank arrangement is provided, comprising:

- at least one pair of the above described fish tanks, arranged in relation to each other such that the facing walls of the fish holding sections of the two fish tanks define a space between the fish tanks, and
- a maintenance walkway disposed in said space at such a height that a person standing on the maintenance walkway can reach into the fish holding section from above.

Another aspect of the present invention relates to a fish farm of any size, comprising a plurality of fish tanks having the inventive structure described in the foregoing. At least two fish tanks are arranged as a pair, and in the space between these fish tanks a maintenance walkway is provided which allows a user to perform maintenance and service work on the fish tanks.

The fish tank arrangement according to the present invention can be developed by providing a plurality of fish tank pairs arranged relative to each other such that the spaces between the fish tank pairs form a maintenance alleyway, and by providing a maintenance gangway formed by the maintenance walkways. Due to this advantageous arrangement, a user of the fish tank arrangement can efficiently perform maintenance work and service work on a plurality of fish tank pairs that are arranged such that a first row is formed by one fish tank of each pair, and a second row is formed by the respective other fish tank of each pair. For this purpose, a maintenance gangway is positioned between the two rows formed by the pairs of fish tanks, with the gangway providing an elevated place to stand and perform maintenance and service work. It should be understood in this regard that the maintenance gangway, like the aforementioned maintenance walkway, is preferably fixed stationarily or movably on the frame structure of the fish tanks.

It is further preferred when the fish tank arrangement according to the present invention includes a harvesting wagon which is mounted to be displaceable in the axial direction of the maintenance gangway, and has a container for receiving fish, said container preferably being connectable by means of a harvesting line to the harvesting opening of a fish tank. Such a harvesting wagon, according to the present invention, greatly facilitates the use of the inventive fish tank arrangement and makes more efficient operation possible. The harvesting wagon, being designed to be longitudinally displaceable, can be moved along the fish tanks, and in this way, can be moved to a particular fish tank which is to be harvested. The harvesting operation itself can be carried out in the conventional manner, using dip nets or the like, or with the fish being filled directly into the container of the harvesting wagon via a short pathway. In one particularly preferred embodiment of the present invention, a direct connection is formed between the fish holding section and the container of the harvesting wagon, for example via a harvesting line that can be connected to a matching opening in the tank, thus achieving a flow of fish from the fish tank into the container of the harvesting wagon, preferably under the force of gravity. It should be understood in this regard that the harvesting wagon preferably includes a mechanism for conveying at least part of the water flowing out of the container back into the fish tank, for example by a pump, with an appropriate device being provided to retain the fish in the container of the harvesting wagon.

According to yet another preferred embodiment of the present invention, the indoor fish tank arrangement is developed by a harvesting wagon which is mounted to be displaceable on rails in the axial direction of the maintenance gangway, with the rails preferably being mounted on the frame structure of the fish tank. Such mounting can be carried out specifically by rollers that are disposed on the harvesting wagon and that run on the rails, and allow the harvesting wagon to be moved quietly and effortlessly. More particularly, the rails may be attached to the frame structure in order to achieve an overall more compact and material-saving structure for the inventive arrangement. It should be understood in this regard that the rails may be arranged on either side of the path of travel of the harvesting wagon, and for this purpose, may be arranged and attached to frame structures of adjacent rows of fish tanks.

In one special embodiment of the variant with the harvesting wagon, the harvesting wagon is mounted to be displaceable in the region formed by the spaces between the rows. In this embodiment, the harvesting wagon may be disposed above or below a maintenance gangway disposed in the space between the rows, or may form the maintenance gangway itself, with standing areas being formed on the harvesting wagon.

According to one alternative embodiment of the present invention, the harvesting wagon is mounted to be displaceable in a region that is on the other side of the fish tanks in relation to the spaces. In this case, it is possible to prevent the space between the rows from being doubly occupied by the harvesting wagon and the maintenance gangway, and the harvesting wagon instead has access to the fish tanks from a side different from the space between the rows. Such configurations are particularly suitable in the case of multi-row fish tank arrangements, whereby it should be understood in this regard that a harvesting wagon can also be used for fish tanks that are arranged on either side of its path of travel.

In the embodiments of the present invention that include a harvesting wagon, it is preferred when each fish tank has a closable opening in a wall demarcating the fish holding section from the region in which the harvesting wagon is displaceably mounted, the opening preferably has a connector for a harvesting line on the side facing the harvesting wagon, wherein the openings are preferably at the same height in relation to the path of travel of the harvesting wagon, for example in relation to the ground contact area. By providing an appropriate connector on the harvesting wagon, the harvesting wagon can thus be connected in a quick and efficient operation to the fish tank, so as to perform the harvesting operation. Since the connector moves at a constant height when the harvesting wagon is moved, due to the harvesting wagon being horizontally movable, it is advantageous to locate the openings at a matching height as well, so that no major adjustment of the connector needs to be made.

It is further preferred when the wall that demarcates the fish holding section of a first fish tank from the region in which the harvesting wagon is displaceably mounted has a first closable opening which has a connector for a harvesting line on the side facing the harvesting wagon and which opens into the fish holding section of the first fish tank, and a second closable opening which has a connector for a harvesting line on the side facing the harvesting wagon and which opens via a pipeline into the fish holding section of the second fish tank, the first fish tank being disposed between the second fish tank and the area in which the harvesting wagon is displaceably mounted, and the first and second opening preferably being at the same height in relation to the ground contact area. According to this preferred embodiment of the present invention, it is possible to use one harvesting wagon to harvest two fish tanks disposed in different rows, wherein the harvesting wagon is displaceable in a roaming space that is located immediately adjacent to one of the two tanks. The other tank is made accessible to the harvesting wagon by an appropriate pipeline which opens into a matching opening on the side facing the roaming space of the harvesting wagon. It should be understood in this regard, that the first and second closable openings are preferably configured such that closure occurs directly in the tank wall region of the respective fish tank, in order to prevent fish from being in the pipeline after the opening has been closed, and no longer being able to reach the container on the harvesting wagon. The pipeline provided in this embodiment of the present invention may run underneath the first fish tank, or it may run through the fish holding section of the first fish tank.

Another preferred embodiment of the present invention is characterized by four horizontally adjacent rows of fish tanks extending parallel to each other, wherein a maintenance alleyway is formed between the first and second rows, and between the third and fourth adjacent rows, and a region in which the harvesting wagon is displaceably mounted is disposed between the second and third rows, and further characterized by a plurality of openings for connecting a harvesting line, which is disposed in the walls facing the region in which the harvesting wagon is displaceably mounted, wherein each fish tank has an assigned opening. With this embodiment, a particularly space-saving arrangement of fish tanks is provided which is efficient to operate. This arrangement is characterized in that a total of three alleyways are provided between the four fish tanks, the middle one being used to move the harvesting wagon therein, and the harvesting wagon preferably being connectable for harvesting purposes to the fish tanks of all four rows of fish tanks via appropriate pipelines. In the two outer spaces between the rows of fish tanks, appropriate maintenance walkways are provided, which allow service operations and maintenance work to be carried out on each of the fish tanks in the four rows by virtue of the direct access thus provided.

It is further preferred that when the fish tanks are arranged in at least one row, the adjacent fish tanks in the row are arranged relative to each other such that the water outlet from the sedimentation section of a tank opens into the water inlet of a bioreactor section of the adjacent tank, and the sedimentation section of one tank preferably borders on the bioreactor section of the adjacent tank. According to this preferred embodiment, the fish tanks are coupled to each other in a manner that is advantageous for water quality, in that the water circuit is guided alternately through the reactor section, the fish holding section, the sedimentation section, the reactor section, the fish holding section, the sedimentation section, etc. of successive tanks.

It is yet further preferred that when the fish tanks are arranged in at least two rows, a water circuit is formed by the fish tanks of the two rows, wherein at least two pairs of fish tanks opposite each other are arranged in such a manner relative to each other:

that the water outlet from the sedimentation section of one tank in a first row opens into the water inlet of a bioreactor section of another tank in an adjacent row, and that the water outlet of the sedimentation section of one tank of the adjacent row preferably opens into the water inlet of the bioreactor section of another tank in the first row.

In this way, a water circuit through at least two rows of fish tanks is formed that is beneficial for the water quality, and which simplifies the structure. More particularly, the respective linkage between sedimentation sections and reactor sections may be effected in the pairs of fish tanks located at the end of each respective row, in order to form a circuit between the two rows that includes all the fish tanks.

It should be understood in this regard that it is specifically advantageous when the pairs also face each other in such a way that the sedimentation section of the one row lies immediately adjacent to the reactor section of the other row, so that short conduit paths can be realized.

More particularly, the fish tank according to the present invention and the fish tank arrangement according to the present invention permit a method for harvesting an indoor fish tank, wherein the method is characterized by the steps of:

connecting a harvesting tank to an opening disposed in a fish holding section of the fish tank;

draining the water in the fish holding section and the fish therein into the harvesting tank, and recycling the drained water to the fish holding section, wherein the draining and preferably the recycling of the water is performed by the influence of gravity.

This method permits simplified and efficient harvesting, in particular under the influence of gravity when raised fish tanks are used.

The method can preferably be carried out in such a way that the harvesting tank is disposed on a displaceable wagon that is moved to the fish tank before the fish are harvested. This facilitates transportation of the harvested fish.

These and other advantages of the invention will be further understood and appreciated by those skilled in the art by reference to the following written specification, claims and appended drawings.

BRIEF DESCRIPTION OF THE DRAWINGS

Preferred embodiments of the invention shall now be described with reference to the attached drawings, in which:

FIG. 2: shows a cutaway view in side elevation of the fish tank in FIG. 1, FIG. 3: shows a plan view of the fish tank in FIG. 1, FIG. 4: shows a perspective view, from the side and from above, of an inventive fish tank according to a second embodiment of the present invention, FIG. 5: shows a cutaway view in side elevation of the fish tank in FIG. 4, FIG. 6: shows a plan view of the fish tank in FIG. 4, FIG. 7: shows a cross-sectional view of an indoor fish farm having an inventive fish tank arrangement in four rows according to the first embodiment of the present invention.

DETAILED DESCRIPTION OF PREFERRED EMBODIMENTS

Figure 1:
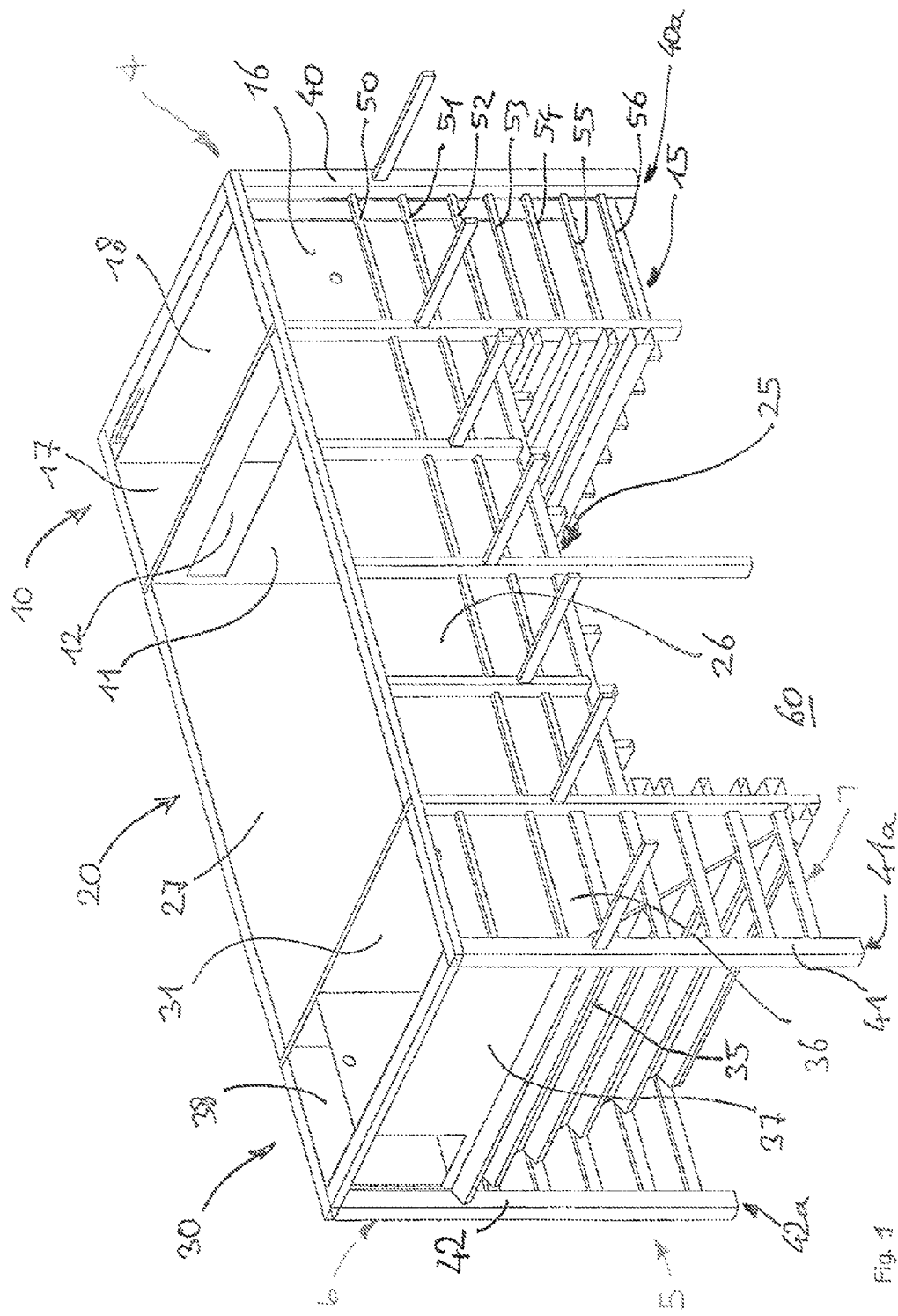
FIG. 1: shows a perspective view, from the side and from above, of an inventive fish tank according to a first embodiment of the present invention.
Figure 4:
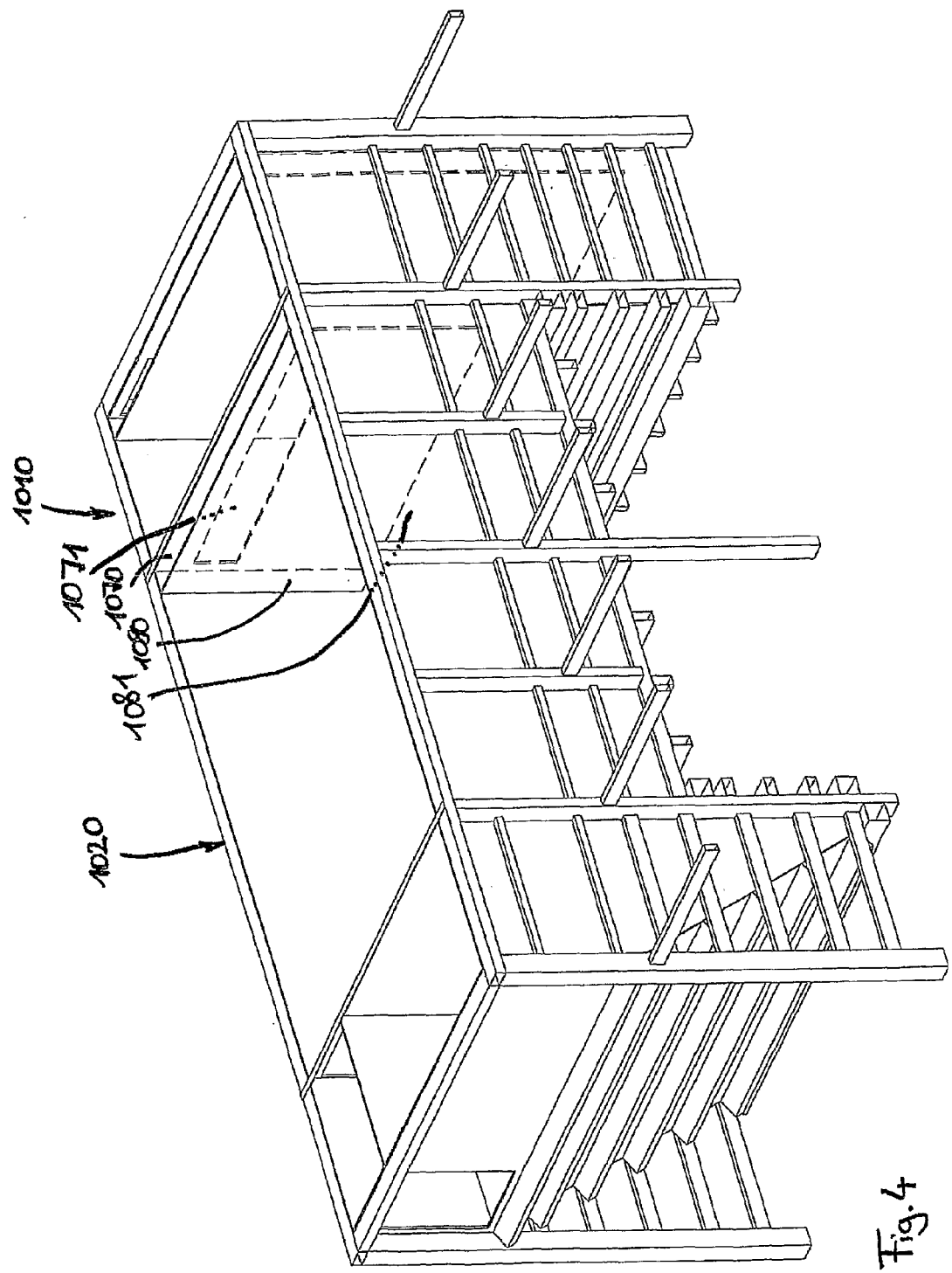

For purposes of description herein, the terms "upper," "lower," "right," "left," "rear," "front," "vertical," "horizontal," and derivatives thereof shall relate to the invention as orientated in FIGS. 1 and 4. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

FIGS. 1-3 show a fish tank 4 according to a first embodiment of the present invention. The fish tank 4 comprises a bioreactor section 10, a fish holding section 20 and a sedimentation section 30. The three sections 10, 20, 30 are formed in a tank 4 made in one piece and having wall and bottom regions, and are separated by partitions. A first partition 11 separates the bioreactor section 10 from the fish holding section 20, and has a longitudinal opening 12 in its upper region through which freshly treated water flows from the bioreactor section 10 into the fish holding section 20. The water is treated in the bioreactor section 10 by bubbling in fine-bubbled air from the bottom region of the bioreactor section 10 and by microbiological processes under aerobic conditions.

A second partition 31 separates the fish holding section 20 from the sedimentation section 30. In the second partition 31, an opening 32 is provided at the level of and above the bottom of fish holding section 20 through which water containing sediment flows out of the fish holding section 20 into the sedimentation section 30.

By virtue of this configuration, water flows out of the bioreactor section 10 as a near-surface stream into the upper portion of fish holding section 20, where it causes circulation, as shown by the arrows in FIG. 2.

As can be seen from FIGS. 1-3, the top third portion of sedimentation section 30 is cubic in shape and the adjoining region therebelow tapers downwards in a wedge shape. The solids collect at the lowest point of the sedimentation section 30 and can be removed from there via a separate pipeline (not shown).

The fish holding section 20 is bounded at the bottom by a bottom region 25. In the same manner, the bioreactor section 10 is bounded at the bottom by a bottom region 15. The bottom region 25 of the fish holding section 20 is higher than the bottom region 15 of the bioreactor section 10, which is at approximately the same height as the pointed bottom, of the sedimentation section 30 formed by a slanting bottom region 35.

The reactor section 10, the fish holding section 20 and the sedimentation section 30 are laterally bounded by walls 16, 26, 36, 37, 38, 27, 17, 18, which define a respective interior volume for receiving the water inside the fish tank.

In relation to said interior volume of the fish tank 4, a frame structure 5 consisting of a plurality of braces is disposed outside the walls. The braces can basically be subdivided into vertical braces 6, such as the vertical braces 40, 41, 42 provided at the corners of the tank, and horizontal braces 7, such as braces 50-56 laterally supporting the reactor section. The braces 6, 7 are partly welded to one other and partly bolted to one another in order to allow assembly and the replacement of the walls bounding the fish tank and its holding sections.

The bottom or lower ends of one row of vertical braces 6 rests abuttingly on a ground support or contact area 60, as shown by way of example for the bottom ends 40a, 41a, 42a of vertical braces 40-42. In the illustrated examples, the entire sedimentation section 30 as well as the entire fish holding section 20 and the entire bioreactor section 10 are located above said ground contact area 60. As a result, the bottoms of these sections, more specifically bottom region 15, bottom region 25 and the downwardly slanting bottom region 35 of sedimentation section 30 are also at or raised above the ground contact area 60.

In FIGS. 4-6, a second embodiment of the fish tank according to the present invention is shown, which incorporates a number of features the first embodiment shown in FIGS. 1-3, and described in the foregoing, and which is therefore described herein only in respect of the features which differ.

Instead of using a first partition between the bioreactor section 1010 and the fish holding section 1020, the second embodiment (FIGS. 4-6) uses a bulkhead arrangement. The bulkhead arrangement is formed by a first bulkhead partition 1070, a second bulkhead partition 1080 spaced apart from the first bulkhead portion 1080 and forming a water conduit shaft 1090 between the two bulkhead partitions 1070, 1080.

The first bulkhead partition 1070 separates the bioreactor section 1010 from the water conduit shaft 1090 and has an opening 1071 extending across its entire width. The opening 1071 is disposed in the region of the upper water surface inside the fish tank.

The second bulkhead partition 1080 separates the water conduit shaft 1090 from the fish holding section, and ends or terminates at a location above the bottom surface 1025 of the fish holding section 1020, thus leaving an opening 1081 that extends across the entire width of the second bulkhead partition 1080. The bottom of opening 1081 is formed by the bottom surface 1025 of the fish holding section 1020, and the opening 1081 extends upwards therefrom across a limited region to the lower edge of the second bulkhead portion 1080.

By virtue of this arrangement, water discharged from the bioreactor section 1010 is through opening 1071 channeled downwards in the water conduit shaft 1090 and exits through opening 1081, just above the bottom surface 1025 of the fish holding section 1020 in a stream flowing parallel to the bottom surface 1025. A circulation pattern marked by the arrows in FIG. 5 is thus formed in the fish holding section 1020, with the circulation flowing in the direction of the sedimentation section 1030 when close to the bottom, and in the direction of the bioreactor section 1010 when close to the surface. This effects particularly efficient removal of sediments from the fish holding section 1020 for depositing into the sedimentation section 1030.

Figure 7:
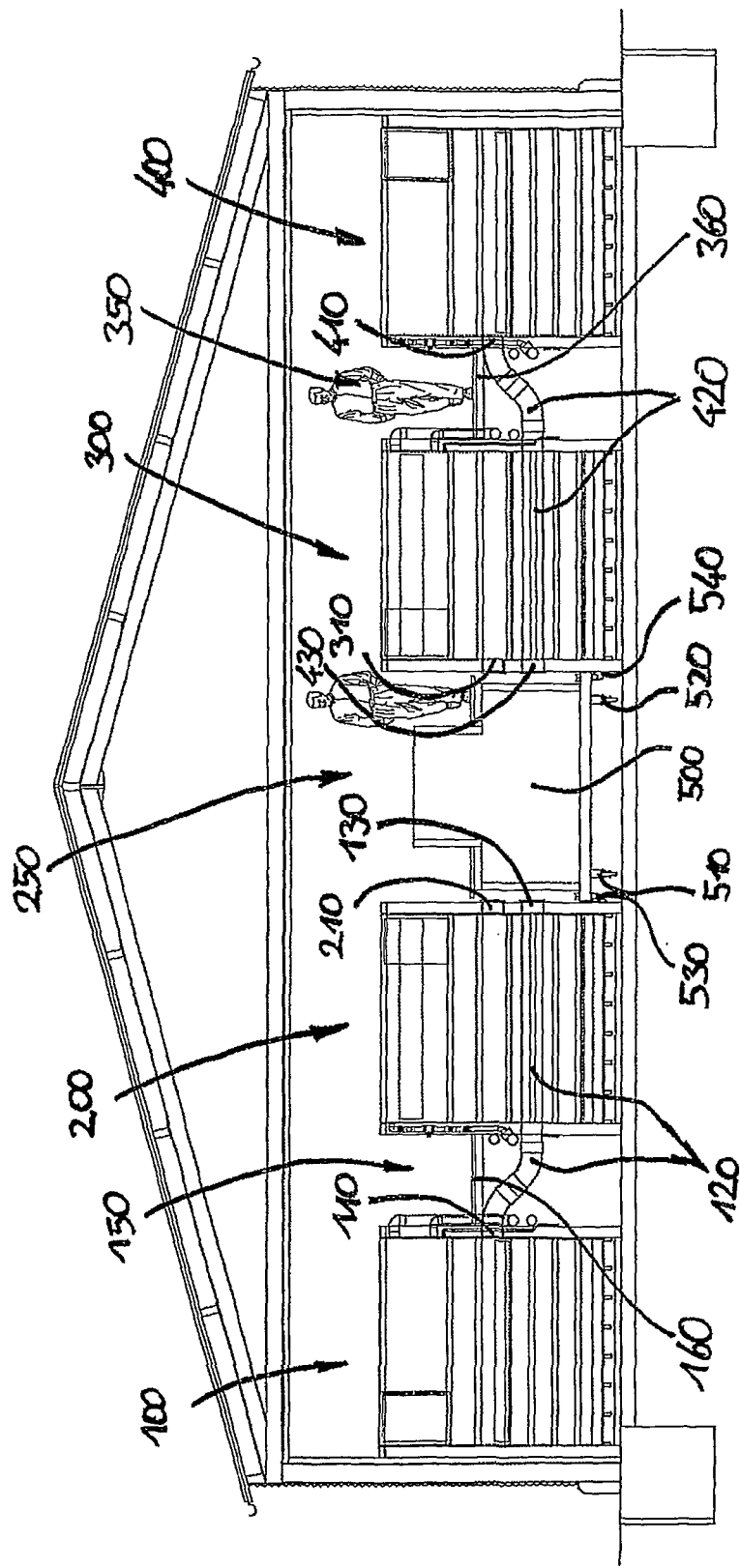

FIG. 7 shows a cross-sectional view of a fish tank arrangement comprising four rows of fish tanks 100, 200, 300, 400. The two fish tanks 100, 200 on the left are arranged at such a distance from each other that a space 150 is formed laterally between them. In said space 150, a walkway 160 raised above the ground contact area 60 is formed, on which a user of the fish tank arrangement of FIG. 7 can move along the two rows of fish tanks 100, 200, and can perform service and maintenance work on the fish tanks in those rows. A space 350 is formed in a symmetrical manner between fish tank rows 300 and 400, in which space a maintenance walkway 360 is disposed. Maintenance walkways 160, 360 are formed by a catwalk grating that rests on horizontal braces connected to the frame structure of fish tank rows 100, 200 and 300, 400.

In the central aisle 250 of the fish tank arrangement shown, that is to say the space between fish tank rows 200 and 300, a space is provided that is wider than spaces 150, 350. In this wider space, there is disposed a harvesting wagon 500 which rests and travels on rollers 510, 520 and rails 530, 540, respectively.

In a side wall of the fish holding section of each of the, fish tanks in rows 200 and 300 harvesting openings 210 and 310 are provided, which are formed towards the region in which the harvesting wagon 500 can be displaceably moved or shifted along rails 530, 540. Both openings 210, 310 are at the same height.

Each of the fish tanks in the outer rows 100, 400 likewise has an opening in the side wall of the fish holding section, wherein each of the openings is connected via a pipeline 120, 420 to openings 130, 430, which are oriented towards the central aisle 250 in which the harvesting wagon 500 is displaceably mounted. Sections of pipeline 120, 420 run underneath the bottom region of the fish holding section of the fish tanks in rows 200, 300.

In the example shown, openings 130, 430 are disposed at identical heights and below openings 210, 310 of the fish tanks in rows 200 and 300. The harvesting wagon 500 has connecting lines for harvesting (not shown), preferably oriented towards either side, which can be adjusted in height, and can be moved horizontally with the harvesting wagon in order to connect the openings of all four fish tank rows.

Figure 8:
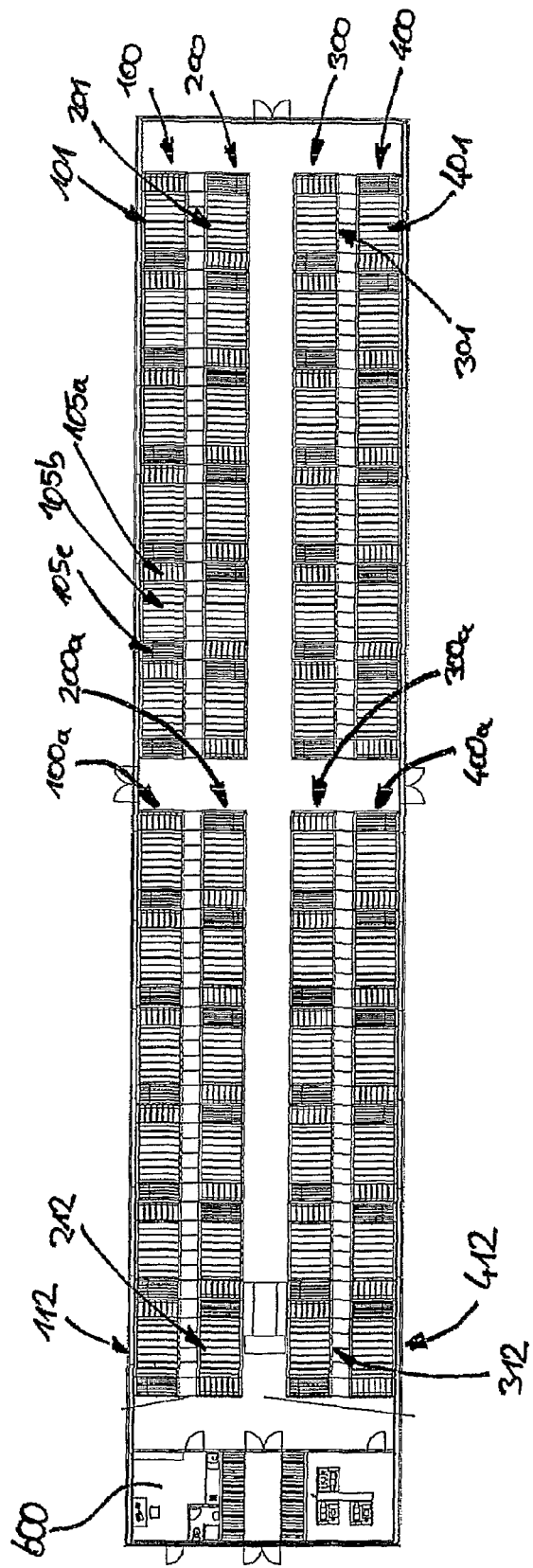
FIG. 8: shows a plan view of the fish farm in FIG. 7, and FIG. 9: shows a cross-sectional view of an indoor fish farm having an inventive fish tank arrangement in four rows according to the second embodiment of the present invention.

FIG. 8 shows a plan view of an arrangement of fish tanks of the type shown in FIG. 1, and illustrates the layout of all the fish tanks provided therein. Each fish tank row comprises a total of 12 fish tanks 101-112, 201-212, 301-312 and 401-412. The fish tanks are each configured according to the embodiment shown in FIG. 1, and each has a reactor section 105*a*, a fish holding section 105*b* and a sedimentation section 105*c*, as shown by way of example with reference to fish tank 105. The fish tanks are preferably arranged end to end in each row such that the sedimentation section of one fish tank is directly adjacent to or adjoined by the bioreactor section of a next adjacent fish tank endwise.

Each row of fish tanks is subdivided into a left-hand group of fish tanks and a right-hand group of fish tanks. The respective left-hand group 100*a*, 200*a* in fish tank row 100, 200 forms a closed, self-contained water circuit, and the left-hand groups 300*a*, 400*a* in row 300, 400 likewise form a closed water circuit, as do the right-hand groups 100*b*, 200*b* and the right-hand groups 300*b*, 400*b* of rows 100-400. This closed water circuit is achieved by water flowing from a respective sedimentation section of one tank in a row into the bioreactor section of an adjacent fish tank in the same row, and, in the pair of fish tanks at both ends of the left-hand and right-hand row sections, by the water flowing from a sedimentation section of the fish tank of the one row into the bioreactor section of the tank of the other row.

Finally, as can be seen from FIG. 8, a central control room 600 is provided in the building accommodating the indoor fish tank arrangement, for controlling operations and monitoring the operation of the fish tanks.

Figure 9:
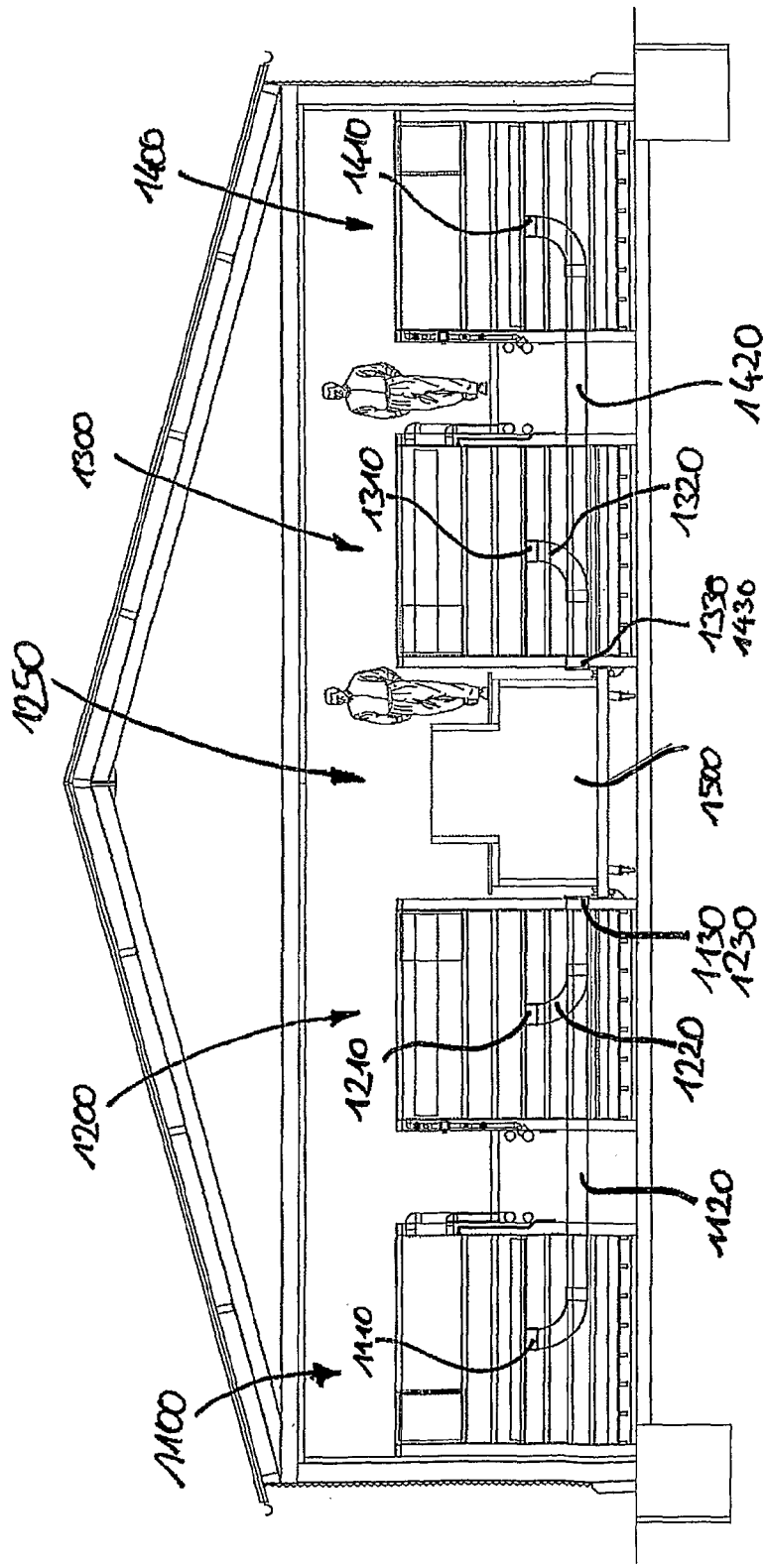

FIG. 9 shows a second embodiment of a fish tank arrangement according to the present invention, which is identical in a number of features with the first embodiment described in the foregoing, and which is described herein only with regard to the features which differ.

Fish tank rows 1200 and 1300 have a harvesting opening 1210 and 1310, respectively, in the bottom region of the fish holding section. Each harvesting opening 1210, 1310 is connected by a pipeline 1220, 1320, which is angled from an initially perpendicularly downward course by 90° into a horizontal course in the direction of the middle aisle 1250, to a connector opening 1230, 1330 formed towards the middle aisle 1250 in which the harvesting wagon 1500 can be displaceably moved. The two openings 1230, 1330 are positioned at identical heights.

The fish tanks in the outer rows 1100, 1400 likewise have one opening each 1110, 1410 that is formed in the bottom region of the fish holding section, each of said openings being connected via a pipeline 1120, 1420 to openings 1130, 1430, which for their part are formed towards the central aisle or middle 1250 in which the harvesting wagon 1500 is displaceably mounted. In this case, pipelines 1120, 1420 run partly underneath the bottom region of the fish holding section of the fish tanks in rows 1200, 1300.

Openings 1130, 1430 are horizontally adjacent to openings 1230, 1330 of the fish tanks in rows 1200 and 1300, and are disposed at identical heights with said openings 1230, 1330.

Consequently, a harvesting pipeline connector which is associated with the harvesting wagon 1500 can be moved horizontally with the latter, and can be moved into the region of the respective opening of the tanks to be harvested. For this purpose, harvesting wagon 1500 has connecting lines for harvesting (not shown), more specifically towards either side, in order to connect the openings in all four fish tank rows to said connector.

The invention, according to one preferred embodiment, provides an ecofriendly indoor fish farm. This indoor fish farm basically consists of a building containing tanks for feeding or breeding aquatic organisms, as well as a processing unit for the breeding water and for the wastewater. The "internal cleaning system", comprising an integrated unit in which the fish are kept, biological processing of the breeding water and a sedimentation section, is used for the indoor fish farm. This contrasts with external cleaning units which process the breeding water biologically outside the fish tank.

The indoor fish farm is composed of one to several modules and contains the following technical components:
  fish tanks (including bioreactor and sedimentation sections)
  air pipeline network
  wastewater network
  compressor for process air
  feeder units
  wastewater treatment system
  container for fish manure
  control and monitoring system The fish tank is basically designed in three parts. It consists of a fish section (or fish holding section), a bioreactor section and a sedimentation section. The fish holding section is located in the middle, between the bioreactor and sedimentation sections. The bioreactor and the sedimentation sections are each spatially demarcated from the fish holding section by a partition. Sieves incorporated in these partitions create a linkage between the units and the entire waterbody. Functionally, however, each part must be seen as an autonomous unit to which a specific role is assigned.

The fish holding section is the part where the fish are kept. In order to provide the fish with optimal living conditions, the water must be circulated and purified (for uniform distribution of dissolved substances such as oxygen, for example). Underneath the biopack in the bioreactor, large quantities of air are injected via a special fan system, as a result of which the water column in the biological purification stage (the bioreactor) is raised. Pressure is built up in the bioreactor due to the water being raised. In the partition between the bioreactor and the fish section, there is a grating near the water surface. The pressure generated in the bioreactor can diffuse through the grating, as a result of which produce a flow in the longitudinal direction of the tank at the water surface. The flow continues in the direction of the sedimentation section and decreases with increasing distance from the bioreactor. The strength of flow is sufficient to transport suspended particles in the direction of the partition between the sedimentation part and the fish section. At the partition of the sedimentation section, the water flow is deflected in the direction of the tank bottom, and from there back in the direction of the bioreactor. When the water arrives at the bioreactor, the circulation flow is re-deflected towards the surface of the water. From there, it is replenished with new flow energy, so that circulation can recommence, and a circulatory flow is accordingly present in the tank, as shown in FIG. 2.

It is clear from the flow conditions within the tank, as described above, that some of the circulating water in the fish section flows past the grating of the sedimentation section, and hence also that part of the suspended particles cannot enter the sedimentation section. In order to increase the accumulation of particles in the sedimentation section, the flow pattern of circulation can also be deflected, according to the present invention, in the direction of the tank bottom. This deflection is achieved by inserting an additional bulkhead partition that is positioned parallel to the demarcating bulkhead partition between the bioreactor section and the fish holding section. At the bottom of this additional bulkhead partition there is a grating through which the water can flow. The water flows out of the bioreactor section through the near-surface grating system of the first bulkhead partition, collides with the additional bulkhead partition, and is deflected in the direction of the tank bottom, where it changes direction towards the sedimentation section, flows through the fish holding section near the bottom, and directly from there through the grating in the partition to enter the sedimentation section, as shown in FIG. 5.

An important part of the indoor fish farm is the bioreactor and the aeration system. In the bioreactor, the nitrogen excreted by the fish as ammonia is oxidized via nitrite to nitrate by micro-organisms (nitrification), similar to the process occurring in natural waterbodies. The micro-organisms colonize the substrate of the fixed-bed bioreactor and form the "biofilm". The entire substrate unit is referred to as a "biopack". By treating the production water biologically, the fish are thus provided with ideal growth conditions, and the micro-organisms are supplied with oxygen.

Recirculation systems are not totally closed systems. In order to counteract the accumulation of certain substances (such as nitrate, for example), and thus to provide optimal water conditions for the fish, a predetermined volume of water is removed from the tank and replaced by fresh water. The water renewal rate, including evaporation, is between five and ten percent per day. Daily removal of water is primarily attributable to the removal of sludge produced by fish excrement and uneaten feed. Suspended particles are kept suspended in the fish section by the circulation flow initiated by the bioreactor and produced near the water surface. The fish excrement and feed remnants pass from the fish section into the sedimentation section by suction force via a grating at the bottom of the fish section. This suction force is produced by a mammoth or large pump which pumps water out of the sedimentation section into a bypass. The bypass is used for connecting and for exchanging water with the adjacent tanks. The excrement and feed remnants accumulate in the funnels of this third functional unit and every two hours are automatically transferred pneumatically from the funnels of the sedimentation units to the wastewater treatment system by mammoth pumps. The sedimented fish manure is pumped out of this system into a large storage container and can subsequently be spread as fertilizer on land. By flowing through an aerobic and an anaerobic biological chamber, the discharge water is purified and can be released to a receiving water or maturation pond, or can drain into the municipal sewer system.

The process air can be supplied by rotary piston compressors located in the plant room. Depending on the size of the farm, at least one or more rotary piston compressors bear the basic load. One compressor with the same power rating is available on standby to supply the farm with air in the event of plant failure. All production control, monitoring and documentation with preset operating parameters, in-built alarm system and production comparisons is carried out with the aid of a computer program.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. An indoor fish tank, comprising:
a plurality of walls and a plurality of bottoms interconnected to define a tank container having:
a fish holding section for fish agriculture;
a sedimentation section for removal of solids by a separate pipeline, the sedimentation section having at least one opening communicating with said fish holding section in such a way that water from a bottom region of said fish holding section flows out of said fish holding section into said sedimentation section;
a bioreactor section bubbling fine-bubbled air therein having at least one opening communicating with said fish holding section in such a way that water from a region close to the upper surface of said bioreactor section flows out of said bioreactor section into said fish holding section;
a frame structure having:
a ground contact portion which abuttingly supports said frame structure on a support surface, and being connected with said walls and said bottoms of said tank container in such a way that the bottom of said fish holding section is disposed above said ground contact portion of said frame;
and a plurality of braces which rest against outer surfaces of said walls and said bottoms of said tank container and support the same against the static pressure exerted by the water held in said tank container.

2. An indoor fish tank as set forth in claim 1, wherein:
said sedimentation section has a bottom disposed above said ground contact portion of said frame structure.

3. An indoor fish tank as set forth in claim 2, wherein:
said bioreactor section has a bottom disposed above said ground contact portion of said frame structure.

4. An indoor fish tank as set forth in claim 1, including:
a closable opening formed in a wall bounding said fish holding section, and having a connector for attaching thereto one end of a harvesting line disposed outside of said tank container.

5. An indoor fish tank as set forth in claim 1, wherein:
said fish holding section is disposed geometrically between said bioreactor section and said sedimentation section.

6. An indoor fish tank as set forth in claim 1, including:
a flow shaft positioned between said bioreactor section and said fish holding section, and being separated from said bioreactor section by a first bulkhead partition which has an opening in a top portion thereof, and which is separated from said fish holding section by a second bulkhead partition which has an opening in a lower portion thereof, with a lower boundary edge of said opening disposed level with the bottom of said fish holding section.

7. An indoor fish tank as set forth in claim 1, including:
at least one pair of said fish tanks arranged in relation to each other such that facing walls of said fish holding sections of said two fish tanks define a space therebetween; and
a maintenance walkway disposed in said space at such a height that a person standing on said maintenance walkway can reach into both of said fish holding sections from above.

8. An indoor fish tank as set forth in claim 7, comprising:
a plurality of fish tank pairs arranged relative to each other such that said spaces between said fish tank pairs form a maintenance alleyway; and
a maintenance gangway formed by said maintenance walkways.

9. An indoor fish tank as set forth in claim 8, comprising:
a harvesting wagon mounted to be displaceable in an axial direction of said maintenance gangway and having a container for receiving fish therein which is connectable to said harvesting opening of said fish tanks by a harvesting line.

10. An indoor fish tank as set forth in claim 9, wherein:
said harvesting wagon is mounted to be displaceable on rails extending in the axial direction of said maintenance gangway, which areas supported on said frame structure of said fish tank.

11. An indoor fish tank as set forth in claim 10, wherein:
said harvesting wagon is mounted to be displaceable in the region formed by said spaces between said rows.

12. An indoor fish tank as set forth in claim 10, wherein:
said harvesting wagon is mounted to be displaceable in a region that is on the other side of the fish tanks in relation to said spaces.

13. An indoor fish tank as set forth in claim 9, wherein:
each said fish tank has a closable opening in a wall thereof associated with said fish holding section and oriented toward said harvesting wagon, which includes a connector for attaching a harvesting line onto said harvesting wagon.

14. An indoor fish tank as set forth in claim 9, including:
four horizontally adjacent rows of said fish tanks extending parallel to each other, wherein a maintenance alleyway is formed between first and second and between third and fourth adjacent rows, and a region in which said harvesting wagon is displaceably mounted is disposed between said second and third rows;
a plurality of openings for connecting a harvesting line, which are disposed in the walls facing said region in which said harvesting wagon is displaceably mounted, wherein each said fish tank is assigned an opening and said openings are arranged horizontally at the same height.

15. An indoor fish tank as set forth in claim 8, wherein:
said fish holding section of a first one of the fish tanks includes:
a first closable opening having a connector for a harvesting line on the side facing said harvesting wagon and which opens into the said holding section of said one fish tank; and
a second closable opening having a connector for a harvesting line on the side facing said harvesting wagon and which opens via a pipeline into said fish holding section of a second one of said fish tanks; and
wherein said first fish tank is disposed between said second fish tank and the area in which said harvesting wagon is displaceably mounted, and said first and second openings are at the same height in relation to said ground contact area.

16. An indoor fish tank as set forth in claim 1, wherein:
said fish tanks are arranged in at least one row, wherein adjacent fish tanks in the row are arranged relative to each other such that the water outlet from said sedimentation section of a first one of said tank container opens into the water inlet of said bioreactor section of said adjacent tank containers, and said sedimentation section of said first tank container borders on said bioreactor section of an adjacent tank container.

17. An indoor fish tank as set forth in claim 1, including:
a plurality of said fish tanks arranged in at least two rows with a water circuit is formed by said fish tanks of the at least said two rows, wherein at least two pairs of said fish tanks opposite each other are arranged in such a manner relative to each other, wherein:
- a water outlet from said sedimentation section of one tank in a first row opens into a water inlet of a bioreactor section of one tank in an adjacent row; and
- a water outlet of said sedimentation section of one tank of the adjacent row opens into a water inlet of the bioreactor section of one tank in the first row.

* * * * *

UNITED STATES PATENT AND TRADEMARK OFFICE
CERTIFICATE OF CORRECTION

PATENT NO. : 8,622,025 B2  
APPLICATION NO. : 13/123038  
DATED : January 7, 2014  
INVENTOR(S) : Böer et al.

Page 1 of 1

It is certified that error appears in the above-identified patent and that said Letters Patent is hereby corrected as shown below:

On the Title Page  
Abstract, Item (57), line 1  
    after "a" insert --plurality--

In the Specification  
Col. 1, line 9  
    "groundflows" should be --ground flows--

Col. 2, line 57  
    delete "a" (first occurrence)

Col. 9, line 6  
    "portion 1080" should be --partition 1070--

Col. 9, line 22  
    "portion" should be --partition--

Col. 11, line 14  
    "system"," should be --system,"--

Col. 12, line 25  
    ""biofilm"." should be --"biofilm."--

Col. 12, line 26  
    ""biopack"." should be --"biopack."--

In the Claims  
Col. 14, claim 10, line 16  
    "areas supported" should be --are supported--

Signed and Sealed this  
Fifteenth Day of July, 2014

Michelle K. Lee  
*Deputy Director of the United States Patent and Trademark Office*